Figure 1:
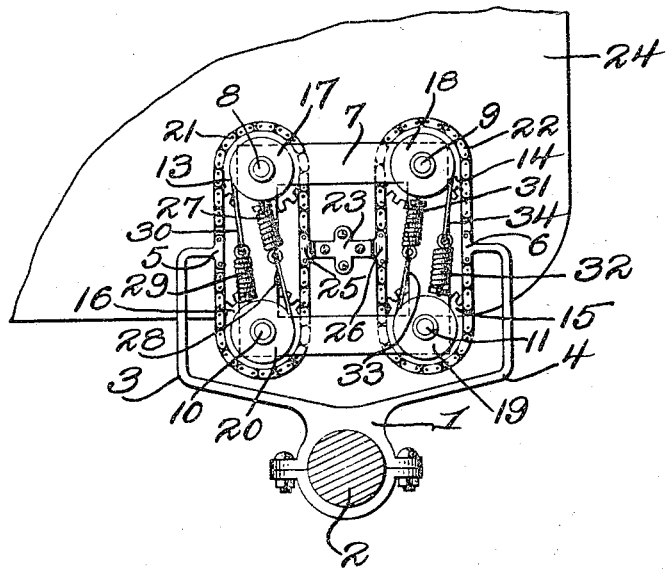

E. L. SCHULTZ.
ROAD EQUALIZER FOR VEHICLES.
APPLICATION FILED SEPT. 19, 1917.

1,285,416.

Patented Nov. 19, 1918.

WITNESSES
John P. Woodworth
Lloyd W. Patch

INVENTOR
Ernst L. Schultz.
BY Richard B. Owen.
ATTORNEY

UNITED STATES PATENT OFFICE.

ERNST L. SCHULTZ, OF ERWINNA, PENNSYLVANIA.

ROAD-EQUALIZER FOR VEHICLES.

1,285,416.

Specification of Letters Patent.

Patented Nov. 19, 1918.

Application filed September 19, 1917. Serial No. 192,144.

*To all whom it may concern:*

Be it known that I, ERNST L. SCHULTZ, a citizen of the United States, residing at Erwinna, in the county of Bucks and State of Pennsylvania, have invented certain new and useful Improvements in Road-Equalizers for Vehicles, of which the following is a specification.

This invention relates to a road equalizer for vehicles and more particularly to a device intended to be used with or entirely supplant the load springs as now ordinarily fitted between the body and running gear of automobiles and like vehicles, it being a purpose of my invention to provide a device of the character described which is so constructed that any road inequalities are taken up and compensated for in the equalizer, thus giving the body substantially a suspension and floating mounting, rather than a bearing mounting, and practically leaving the body in the same position at all times.

A further object resides in providing a structure which can be used in either underslung or overslung mountings and which adapts itself to application in substantially all connections where the ordinary types of load springs can be used.

Yet another object is to so construct the parts that not only are inequalities in the road surface compensated for but when any obstructions or irregularities are passed over, the structure will again readjust automatically to give the proper relative positioning of the axle with respect to the body, and without the rebound shock which is ordinarily to be reckoned with where load springs of the present types are employed.

With the above and other objects in view, which will be understood from the specification, drawings, and claims, my invention consists in certain novel features of construction and combinations of parts which will be hereinafter more fully set forth.

In the drawings:—

Figure 2:
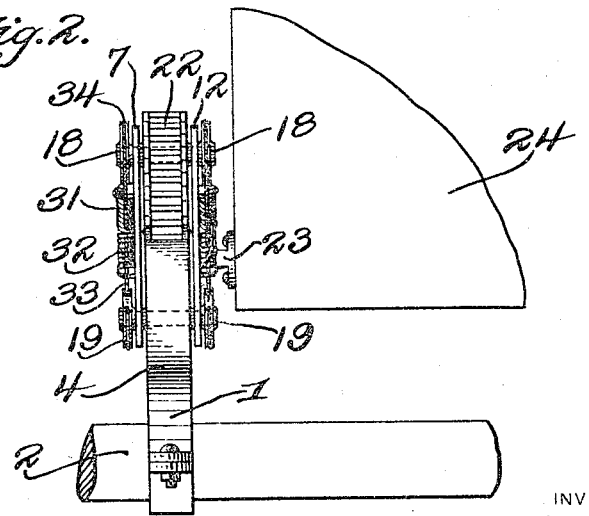

Figure 1 is a view in elevation showing the device of my invention as it would be mounted in conjunction with a vehicle axle and body; and, Fig. 2 is a view taken at right angles to the disclosure in Fig. 1.

A bracket member 1 is secured in conjunction with the axle or axle housing 2, of the vehicle, and has branch arms 3 and 4 extending outwardly, upwardly, and then bent inwardly to terminate at their ends in chain link members 5 and 6. A substantially rectangular frame 7 has the shafts 8, 9, 10, and 11 journaled therein, a second frame member 12 being provided with bearings in which the opposite ends of the shafts 8, 9, 10, and 11 are journaled. By mounting the shafts in the manner set forth, the ends extend through the frame members 7 and 12, which are spaced apart, and provision is thus made for securement of the broad sprocket wheels 13, 14, 15, and 16, on the middle portions of these shafts, it being understood that the frame members 7 and 12 are mounted on opposite sides of the broad sprocket wheels. Grooved pulleys 17, 18, 19, and 20 are provided in pairs and are mounted on the extending ends of the shafts 8, 9, 10, and 11, these grooved pulleys and the sprocket wheels all being keyed or otherwise fixedly secured on their respective shafts so that as any one of the shafts may be turned through force exerted against the pulley wheels thereof, the sprocket wheel will also be turned, and the reverse.

Sprocket chains 21, and 22 are made broad and strap-like, and are mounted over the broad sprocket wheels 13 and 16, and 14 and 15, respectively so that they couple these sprocket wheels together, it being understood that the chains are drawn rather tightly. The branched arms 3 and 4 of the bracket portion 1 are made of such spread that the chain link formation 5 and 6 thereof can be connected in the outer lengths of the chains 21 and 22, and a bracket portion 23 is fixedly mounted on the body 24 of the vehicle or on the frame structure thereof, and is provided with the chain link members 25 and 26 which are of such character that they can be connected in the inner straight lengths of the strap-like chains 21 and 22 a mounting thus being accomplished between the chains and the body and a connection also being established through the bracket portion 1, from the axle to the outer straight lengths of the chain.

Coil springs 27 are mounted on the frame members 7 and 12 adjacent the pulley wheels 17, and cables 28 are connected with the free ends of these springs and are then carried around the pulley wheels 20 and are securely fastened thereto, coil springs 29 being also mounted on the frame portions 7 and 12 and have cables 30 connected therewith carried around the grooved pulley wheels 17 and secured thereto. Coil springs 31 and 32 are connected on the frame portions 7 and 12 adjacent the pulley wheels 18 and 19, and these springs 31 and 32 have cables 33 and 34 attached thereto and carried around and secured upon the pulley wheels 19 and 18 respectively, it of course being understood that the cables 30 and 28 of the one set will exert drawing tension against the pulley wheels with which they are connected in a manner to turn both shafts in the same direction, the similar action being accomplished by the connection of the cables 33 and 34, but the direction of turning of the grooved pulley wheels being reversed.

As has been stated, the pulleys are provided in pairs and are connected on the two extending ends of the various shafts, and as the springs and cables are provided for each of the grooved pulley wheels, it will thus be seen that four springs are acting upon each of the strap-chains 21 and 22, to cause the same to be given traveling movement in one direction. In the use of the structures, the equalizers will be provided in pairs to be connected at each side of the body of the vehicle, between the body and the axle, or where the body is to be heavily laden, two or more equalizers might be mounted at each side of the body. The connection with the axle is accomplished through the bracket portion 1 while the connection with the body is through the bracket member 23, and thus the total weight of the body as supported by the axle is brought to bear upon the strap-chains 21 and 22, the arms 3 and 4 exerting upward strain on the outer length of these chains and the bracket portion 23 exerting a downward pull on the inner length of the chains. As has been stated, the chains are fitted rather tightly around the sprocket wheels, and as the grooved pulley wheels are connected to turn with the sprocket wheels and turning movement thereof is resiliently opposed through the various springs 27, 29, 31, and 32, the body will be given a full floating suspension and mounting. As stones, ruts, and other obstructions may be encountered on the road, the axle 2 will be compelled to rise up so that the wheels can ride over the obstruction, and this will naturally place additional and rather sharp strain upon the springs, which will cause the same to be extended in such a way that the ends of the branched arms 3 and 4 of the bracket portion 1 will rise above the position as shown in Fig. 1 of the drawings where they are substantially in a horizontal line with the bracket portion 23, this movement of the chains acting to lower the body structure, and thus compensate for the rise of the axle, in other words, as the axle is raised through the wheels striking an obstruction or an irregularity of the road, the chains 21 and 22 will be moved in such a way that the body will be lowered with respect to the frame portions 7 and 12 to such an extent that the body will continue in practically the same position at all times, and will be rendered independent of the position of the road.

From the foregoing it will be seen that I have provided a structure which can be applied as an equalizer on automobiles or other vehicles to take the place of the usual load springs as now generally employed in the mounting of the body or frame to be borne by the axle, which structure is of such character that irregularities in the surface over which the vehicle is traveling are compensated for and the parts are returned to the normal relation when the irregularity is passed, and while I have herein shown and described only one specific construction, it will of course be understood that by substantially reversing the parts the structure may be adapted for an underslung mounting of the frame or body upon the axle, that springs of a different type might be employed and that a number of changes and variations might be resorted to in the form and arrangement of the several parts and in the manner of mounting the device, without departing from the spirit and scope of my invention, in view of which fact I wish to be limited only to such points as may be set forth in the claims.

I claim:—

1. A road equalizer for vehicles including substantially rectangular frame portions having bearing openings provided at the corners thereof, shafts mounted in said bearing openings, sprocket wheels fixedly mounted on the shafts, sprocket chains mounted over the sprocket wheels at the sides of said frame portions to have the straight lengths thereof substantially vertically extending, a bracket portion secured on the axle of the vehicle and provided with branched arms extended to connect with the outer straight lengths of the sprocket chains, a bracket mounted on the vehicle frame and connected with the inner straight lengths of the chains, and means to resiliently oppose turning movement of said sprocket wheels.

2. A road equalizer for vehicles including substantially rectangular frame portions having bearing openings provided at the corners thereof, shafts mounted in said bearing openings, sprocket wheels fixedly mounted on the shafts, sprocket chains mounted over the sprocket wheels at the sides of said frame portions to have the straight lengths thereof substantially vertically extending, a bracket portion secured on the axle of the vehicle and provided with branched arms extended to connect with the outer straight lengths of the sprocket chains, a bracket mounted on the vehicle frame and connected with the inner straight lengths of the chains, grooved pulleys fixedly mounted at the ends of the shafts, and means connected with said pulleys to resiliently oppose turning of the shafts.

3. A road equalizer for vehicles including substantially rectangular frame portions having bearing openings provided at the corners thereof, shafts mounted in said bearing openings, sprocket wheels fixedly mounted on the shafts, sprocket chains mounted over the sprocket wheels at the sides of the frame portions to have the straight lengths thereof substantially vertically extending, a bracket portion secured on the axle of the vehicle and provided with branched arms extended to connect with the outer straight lengths of the sprocket chains, a bracket mounted on the vehicle frame and connected with the inner straight lengths of the chains, grooved pulleys fixedly mounted at the ends of the shafts, springs connected with the frame portions, and cables connected with said springs and at their free ends with the grooved pulley wheels.

4. A road equalizer for vehicles comprising a frame, wheels carried by said frame, flexible means passing around said wheels, an axle, a bracket secured to said axle and provided with a plurality of upwardly extending fingers, means carried by said fingers for engaging said flexible means, means for connecting said flexible means to the body of the vehicle, and yieldable means anchored upon said frame and coöperating with said wheels for yieldably holding the body of the vehicle in spaced relation with respect to the axle thereof.

5. A road equalizer for vehicles comprising a frame, an axle, a bracket carried by said frame and provided with a plurality of upwardly extending arms, a plurality of sprocket wheels carried by said frame, said sprocket wheels being arranged in pairs, one pair being arranged above a second pair, sprocket chains passing around the vertically arranged sprocket wheels and being engaged by said arms, means for anchoring said sprocket chains in engagement with the body of the vehicle, pulleys coöperating with said sprocket wheels, and springs anchored upon said frame and coöperating with said pulleys for yieldably holding said pulleys against rotation and consequently yieldably holding said chains against movement upon said sprocket wheels.

In testimony whereof I affix my signature in presence of two witnesses.

ERNST L. SCHULTZ.

Witnesses:
ARTHUR WILLIAMS,
WILSON T. HAGER.

Copies of this patent may be obtained for five cents each, by addressing the "Commissioner of Patents, Washington, D. C."